Jan. 10, 1939.  F. H. LE JEUNE  2,143,445
METHOD OF FORMING BRAKE DRUMS
Filed Dec. 9, 1935  2 Sheets-Sheet 1
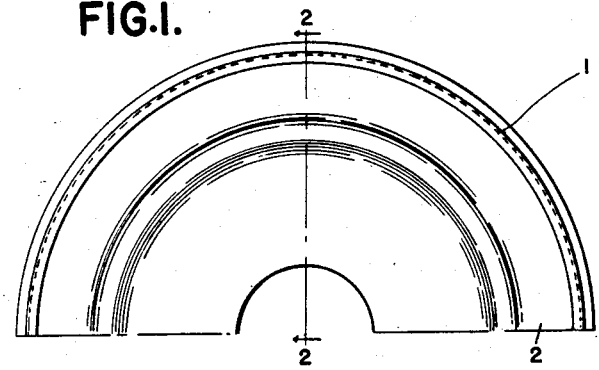
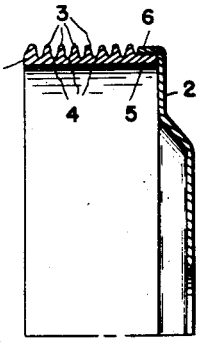
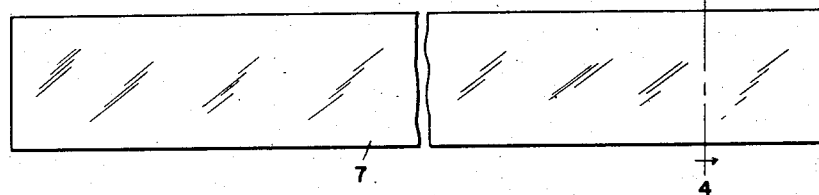
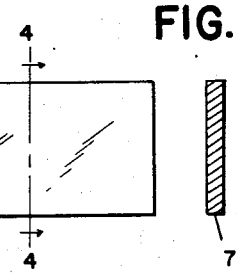
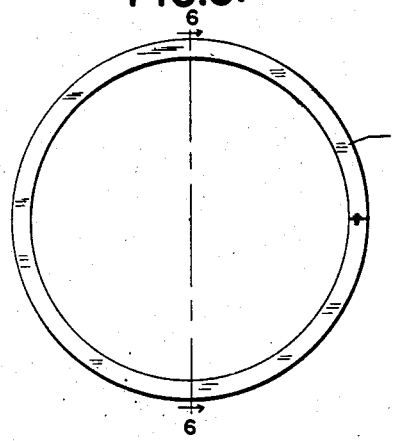
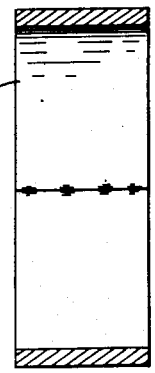
INVENTOR
FRANK H. LeJEUNE
BY *Whittemore Hulbert & Whittemore Belknap*
ATTORNEYS Jan. 10, 1939. F. H. LE JEUNE 2,143,445
METHOD OF FORMING BRAKE DRUMS
Filed Dec. 9, 1935 2 Sheets-Sheet 2

INVENTOR
FRANK H. LeJEUNE
BY
ATTORNEYS

Patented Jan. 10, 1939

2,143,445

UNITED STATES PATENT OFFICE 2,143,445

METHOD OF FORMING BRAKE DRUMS

Frank H. Le Jeune, Detroit, Mich., assignor to Kelsey-Hayes Wheel Company, Detroit, Mich., a corporation of Delaware Application December 9, 1935, Serial No. 53,627

3 Claims. (Cl. 29—152.2)

The invention relates to the manufacture of brake drums and refers more particularly to the method of forming brake drums for use with motor vehicle wheels.

The invention has for one of its objects an improved method of forming a ribbed brake drum. The invention has for another object to provide a method of forming a ribbed brake drum from either flat stock or a casting, the method being such that it may be readily carried out and the brake drum formed thereby will be structurally strong.

These and other objects of the invention will become apparent from the following description, taken in connection with the accompanying drawings, in which Figure 1 is an elevation of a portion of a brake drum made in accordance with a method embodying my invention;

Figure 2 is a cross section on the line 2—2 of Figure 1;

Figure 3 is a plan view of the original blank from which the brake drum is made;

Figure 4 is a cross section on the line 4—4 of Figure 3;

Figure 5 is an elevation of an annular blank made from the original blank shown in Figures 3 and 4;

Figure 6 is a cross section on the line 6—6 of Figure 5;

Figure 7:
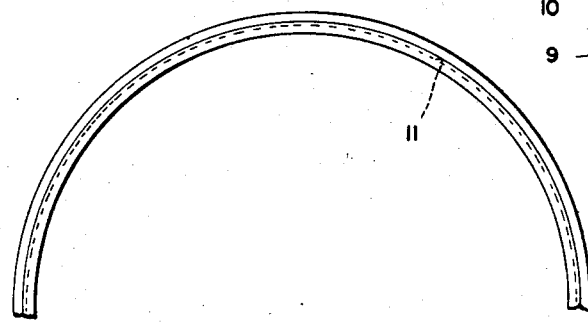
Figures 7 and 8 are views similar to Figures 5 and 6 respectively illustrating the blank after the next operation.
Figure 8:
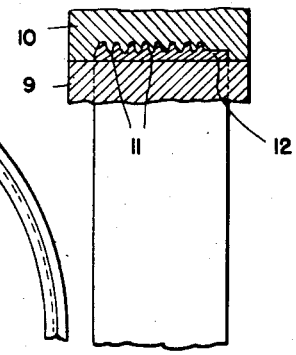

As illustrated in Figures 1 and 2, the composite brake drum comprises the brake ring 1 and the back 2. The brake ring is formed of suitable material providing a good wearing brake surface and the back is preferably formed of sheet steel. The brake ring is provided with the series of external radially extending annular ribs 3 between which are the annular grooves 4. The brake is also preferably provided at one end with the annular portion 5 having an external diameter less than that of the ribs and adapted to fit within the peripheral flange 6 of the back. The brake ring and back are suitably secured together as by welding the portion 5 and the peripheral flange 6 together.

In the manufacture of the brake drum shown in Figures 1 and 2 and as illustrated in Figures 3 to 8 inclusive, I start with the blank 7 of flat stock having a rectangular section. This blank is of indeterminate length. The first step consists in cutting the blank to predetermined length, after which it is hooped and its adjacent ends are welded together. Then the flash at the outside and inside and at the ends of the blank is trimmed, the blank 8 at this time being annular and endless and having a rectangular cross section with predetermined maximum transverse dimensions, as shown in Figures 5 and 6. The blank is also of less diameter than the brake ring 1 which is to be formed from the blank.

The annular blank 8 is then heated to a suitable temperature, which preferably ranges from 1900 degrees F. to 2100 degrees F. After it is so heated, it is rolled between the inner and outer rolls 9 and 10 respectively. The inner roll has a cylindrical surface to form the annular blank with an integral cylindrical brake surface. The outer roll is provided with annular ribs for engaging the external surface of the annular blank. These ribs operate upon the annular blank to displace annular axially spaced portions thereof in a radially inward direction to form the annular grooves 11 and to displace the end portion 12 of the annular blank in a radially inward direction to reduce its thickness. The rolls are also shaped to confine the material of the blank during the rolling, so that the portions of the material of the blank displaced radially inwardly are displaced circumferentially to increase the circumferential extent of the annular blank and enlarge its diameter. It will be noted that during this rolling operation the maximum transverse dimensions of the annular blank remain substantially the same. In other words, the radial dimension of the section of the blank through its ribs which are formed by the grooving and the axial dimension of the section of the blank remain substantially unchanged.

After the rolling, the annular blank is then suitably sized preferably by stretching the same to produce the brake ring 1.

Figure 9:
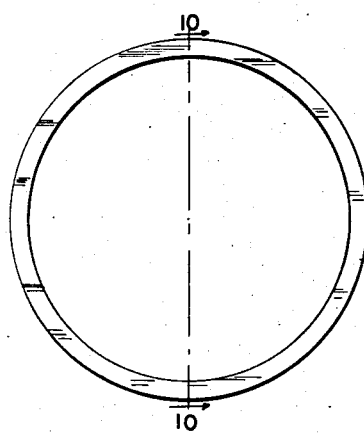
Figure 9 is an elevation of another original blank from which the brake drum may be made in accordance with my method.
Figure 10:
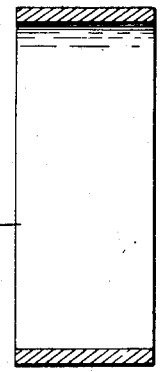
Figure 10 is a cross section on the line 10—10 of Figure 9.

Instead of starting with an annular blank formed from flat stock, I may also start with an annular casting 13 shown in Figures 9 and 10. This casting is preferably a centrifugal casting and the same series of steps may be used in refashioning this annular casting to form the brake ring 1 as are used in refashioning the annular blank of Figures 5 and 6.

From the above description, it will be readily seen that with my method the annular blank, which may be formed from strip stock or may be a centrifugal casting, is operated upon to displace portions of the material thereof in a radially inward direction to thereby form grooves and, as a result, annular ribs. At the same time, the material of the blank is confined so that the radially inwardly displaced material is circumferentially displaced to increase the circumferential extent of the blank. This circumferential extent approximately equals that of the brake ring 1, but if it is slightly less it can be brought to size by stretching. It is apparent that after the brake ring is formed it may be readily assembled with the back and the two suitably secured together as by welding. With this method, the resulting brake drum is relatively light in weight and its brake ring is amply strong and furthermore has a substantial external area for cooling by reason of the external ribs.

What I claim as my invention is:

1. In the method of forming a brake drum, forming an annular blank having a section with predetermined maximum transverse dimensions, grooving the blank by rolling and radially displacing material of the blank, and during the rolling maintaining substantially the same maximum transverse dimensions as those of the original blank and circumferentially displacing material of the blank by the material displaced in grooving the blank to thereby increase the diameter of the blank.

2. In the method of forming a brake drum, forming an annular blank of rectangular section, rolling the blank and during the rolling displacing portions of the material of the blank radially inwardly to form grooves with a rib between adjacent grooves, and during the rolling maintaining substantially the same maximum cross-sectional dimensions as those of the original blank, thereby increasing the peripheral extent of the blank by the material displaced in forming the grooves.

3. In the method of forming a brake drum, forming an annular blank of rectangular cross section having a predetermined maximum radial thickness and a predetermined maximum axial width, rolling the blank and during the rolling displacing portions of the material of the blank radially inwardly to form grooves with a rib between adjacent grooves, and during the rolling maintaining substantially the same maximum radial thickness and the same maximum axial width as those of the original blank and circumferentially displacing the material radially displaced in grooving the blank to thereby increase the diameter of the blank.

FRANK H. LE JEUNE.